United States Patent [19]

No et al.

[11] Patent Number: 5,528,312
[45] Date of Patent: Jun. 18, 1996

[54] BEAM SCAN VELOCITY MODULATION APPARATUS WITH SVM DISABLING CIRCUIT

[75] Inventors: Gwan H. No, Seoul; Hong W. Lee, Bucheon, both of Rep. of Korea

[73] Assignee: Daewoo Electronics Co., Ltd., Seoul, Rep. of Korea

[21] Appl. No.: 275,720

[22] Filed: Jul. 19, 1994

[30] Foreign Application Priority Data

Jul. 20, 1993 [KR] Rep. of Korea ................. 93-13640

[51] Int. Cl.$^6$ ............................................ H04N 5/68
[52] U.S. Cl. ................................. 348/626; 348/805
[58] Field of Search ................................ 348/626, 805

[56] References Cited

U.S. PATENT DOCUMENTS 5,072,300  12/1991  Aderson ............................... 348/626

Primary Examiner—Victor R. Kostak
Assistant Examiner—Nathan J. Flynn
Attorney, Agent, or Firm—Nixon & Vanderhye

[57] ABSTRACT

Beam scan velocity modulation (SVM) apparatus with a svm disabling circuit employed for picture sharpness enhancement is disclosed. The beam SVM includes a picture display device, a source of a first video signal having a picture information displayed on the device when the source is selected, an OSD/TELETEXT display generator having on-screen display information or teletext display information displayed on the device when the generator is selected, a scan velocity modulating circuit coupled to the source for modulating information displayed on the device in accordance with the video content of the first video signal, and a svm disabling circuit responsive to the pulses and the dc voltage and coupled to the scan velocity modulating circuit for modifying operation of the scan velocity modulating circuit when the OSD/TELETEXT display generator is selected. The generator produces pulses, on a line by line basis, and a certain level of dc voltage, indicative of insertion of the picture information and of a full-screen teletext display information. With the beam scan velocity modulation apparatus with svm disabling circuit, an OSD display over a certain display size or a full-screen teletext display is obtained on the screen without any ghost image caused by luminance signal.

6 Claims, 2 Drawing Sheets

BEAM SCAN VELOCITY MODULATION APPARATUS WITH SVM DISABLING CIRCUIT

BACKGROUND OF THE INVENTION

1. Field of the Invention

The present invention relates to a beam scan velocity modulation (SVM) apparatus, and more particularly to a beam scan velocity modulation apparatus with an SVM disabling circuit employed for picture sharpness enhancement.

2. Description of the Prior Art

It is well known that an improvement in apparent picture resolution can be achieved by the use of modulation of the beam scan velocity in accordance with the derivative of a video signal which controls the beam intensity. This video signal is known as the luminance signal and the derivative of the luminance signal is employed for the beam SVM. The beam SVM will improve the picture sharpness in a color television system employing a color kinescope.

Many modern color television receivers also employ alternate video sources. An example of such an alternate video source is commonly referred to as an on screen display (OSD) generator. The function of the OSD generator is to provide additional display informations to a viewer while viewing a typical television program. Thus, OSD generator provides for the display on the television screen of time, day, channel number and other various control informations.

In implementing OSD display, the OSD informations are presented as graphical data together with the normal pictures.

Techniques for generating this type of graphical data which is superimposed upon the television picture are well known in the art. Such techniques include OSD generators which count television scan lines and insert at the correct pixel locations the proper graphics to thereby display the time of day, channel number and words such as "CONTRAST", "COLOR", "MUTE" and so on. The use of an on screen display and an associated OSD generator requires the substitution of a different video signal or kinescope drive for the normal video signal which is being processed by the television receiver. In this manner, the pertinent information can be superimposed upon the viewed image.

A scan modulation circuit modulates the picture displayed on a display device in accordance with the video content of a first video signal. An alternate video signal possesses its picture informations displayed on the display device when the alternate signal is selected. The operation of the scan modulation circuit is varied in accordance with this selection. A problem may occur in regard to scan velocity modulation in television receivers which also include an alternate video signal source such as on screen display generator. As is known, the SVM apparatus operates to modulate the horizontal beam scan velocity in response to differentiated luminance information from the main video source. This modulation may occur prior to OSD deletion of the main luminance signal and insertion of the character signal.

U.S. Pat. No. 5,072,300 (issued to Mark R. Anderson) discloses a beam scan velocity modultion apparatus, which controls the current in a scan velocity modulation (SVM) coil by a blanking pulse in order to eliminate the effect of SVM artefact generation during the operation of an OSD generator in a television receiver. In this arrangement, a ghost image representative of the deleted portions of the main luminance signal may appear on the television screen near or behind the inserted OSD character information since the current flowing in the SVM coil is not completely controlled. The ghost image behind the characters generated by the OSD display appears as an outline of the picture contained in the deleted portions of the main luminance signal.

SUMMARY OF THE INVENTION

The object of the present invention is to provide a beam scan velocity modulation (SVM) apparatus with an SVM disabling circuit capable of eliminating the above-mentioned picture interference when OSD display information and TELETEXT information are displayed over a certain display size on the screen.

In order to achieve the above object, the beam scan velocity modulation (SVM) apparatus with an SVM disabling circuit according to the present invention comprises:

a picture display device;

a source of a first video signal having a picture information displayed on the picture display device when the source is selected;

an OSD/TELETEXT display generator having on-screen display information or teletext display information displayed on the picture display device when the OSD/TELETEXT display generator is selected, the OSD/TELETEXT display generator producing pulses on a line-by-line basis and a certain level of a dc voltage indicative of insertion of the picture information and of a full-screen teletext display information;

a scan velocity modulating circuit coupled to the source for modulating information displayed on the device in accordance with the video content of the first video signal; and an SVM disabling circuit responsive to the pulses and the dc voltage and coupled to the scan velocity modulating circuit for modifying operation of the scan velocity modulating circuit when the OSD/TELETEXT display generator is selected.

With the beam scan velocity modulation apparatus with SVM disabling circuit, an OSD display over a certain display size or a full-screen teletext display is obtained on the screen without any ghost image caused by a luminance signal.

BRIEF DESCRIPTION OF THE DRAWINGS

The above objects and other advantages of the present invention will be more apparent to those skilled in this field by a preferred embodiment with reference to the attached drawings, in which.

DETAILED DESCRIPTION OF THE PREFERRED EMBODIMENT

Figure 1:
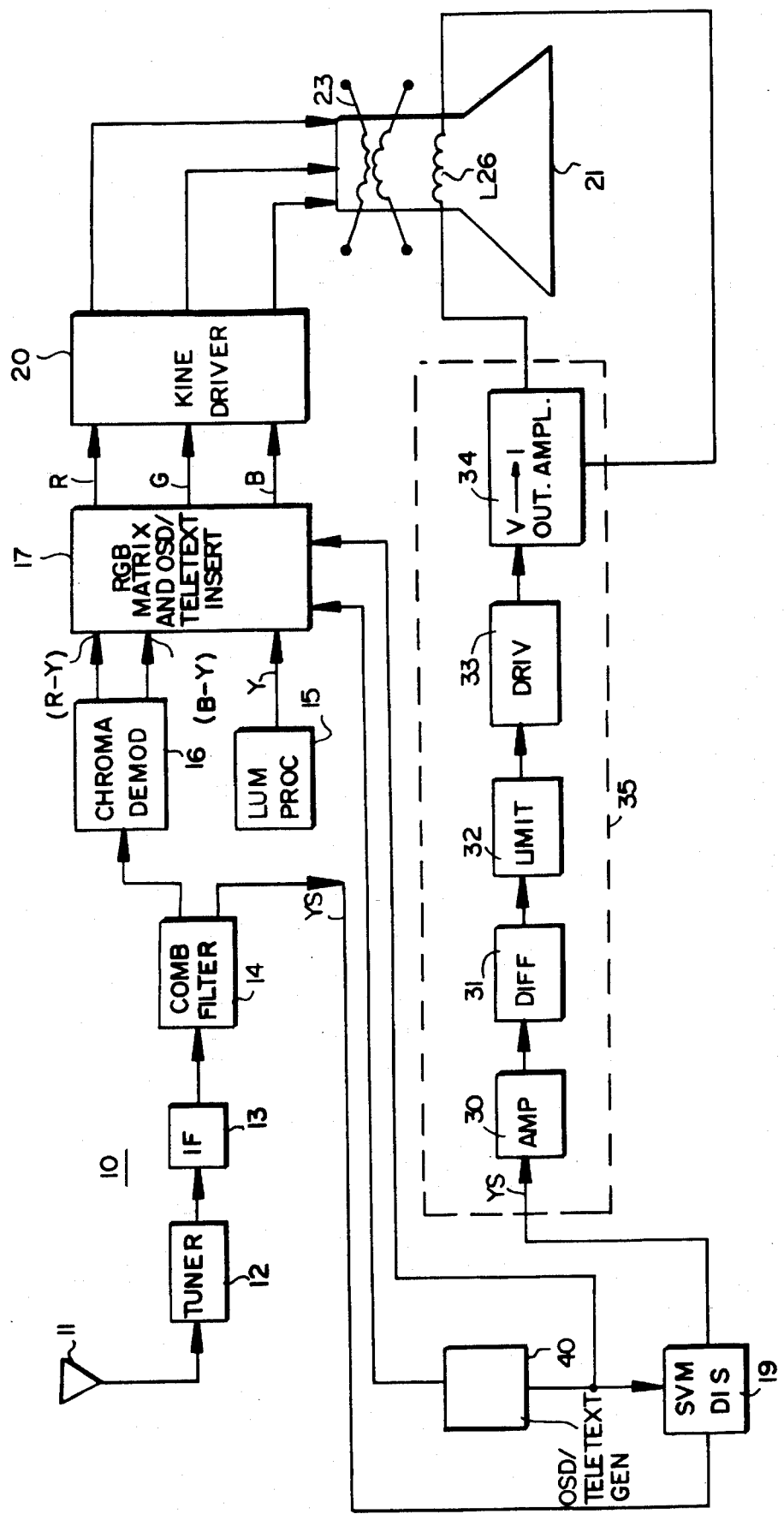
FIG. 1 is a block diagram circuit of a color television receiver employing beam scan velocity modulation apparatus having an SVM disabling circuit according to one embodiment of the present invention.

In the color television receiver 10 of FIG. 1, an antenna 11 is conventionally coupled to a tuner 12. The output of tuner 12 is applied to an IF stage 13. The output of IF stage 13 is directed to the input of a comb filter 14. Comb filter 14 provides an output which is directed to the input of a luminance processor 15 for processing the luminance signal and another output which is directed to a chroma demodulator 16. Luminance processor 15 has a conventional circuit and responds to the luminance signal contained in the composite color video signal developed at the output of IF stage 13. Chroma demodulator 16 provides the color difference signals such as the R-Y and the B-Y signals.

The luminance signal Y from the output of luminance processor 15 and the color difference signals from the output of chroma demodulator 16 are applied to a stage 17. Stage 17 is referred as an RGB matrix and OSD/TELETEXT insertion stage. Stage 17 receives the color difference signals and the luminance signal. In one mode, stage 17 operates strictly as an RGB matrix. In this mode, the matrix conventionally processes the color difference signals with the luminance signal to provide the red (R), green (G), and blue (B) signals. The R, G, and B signals are applied to a kinescope driver circuit 20, which drives a color kinescope 21 associated with a conventional color television receiver.

Located on the neck of kinescope 21 is a main deflection yoke 23 comprising horizontal and vertical deflection windings, each winding of which is subjected to energization by respective horizontal and vertical deflection circuits (not illustrated) to develop a raster of scanning lines on the viewing screen of kinescope 21. Supplemental deflection of the respective beams in the kinescope is supplied by an auxiliary deflection coil 26 which operates to provide a scan velocity modulation. Auxiliary deflection coil 26 (for providing the SVM) may be a single coil or a coil having multiple windings. Energization of coil 26 is accomplished by means of a scan velocity modulation stage 35.

Figure 2:
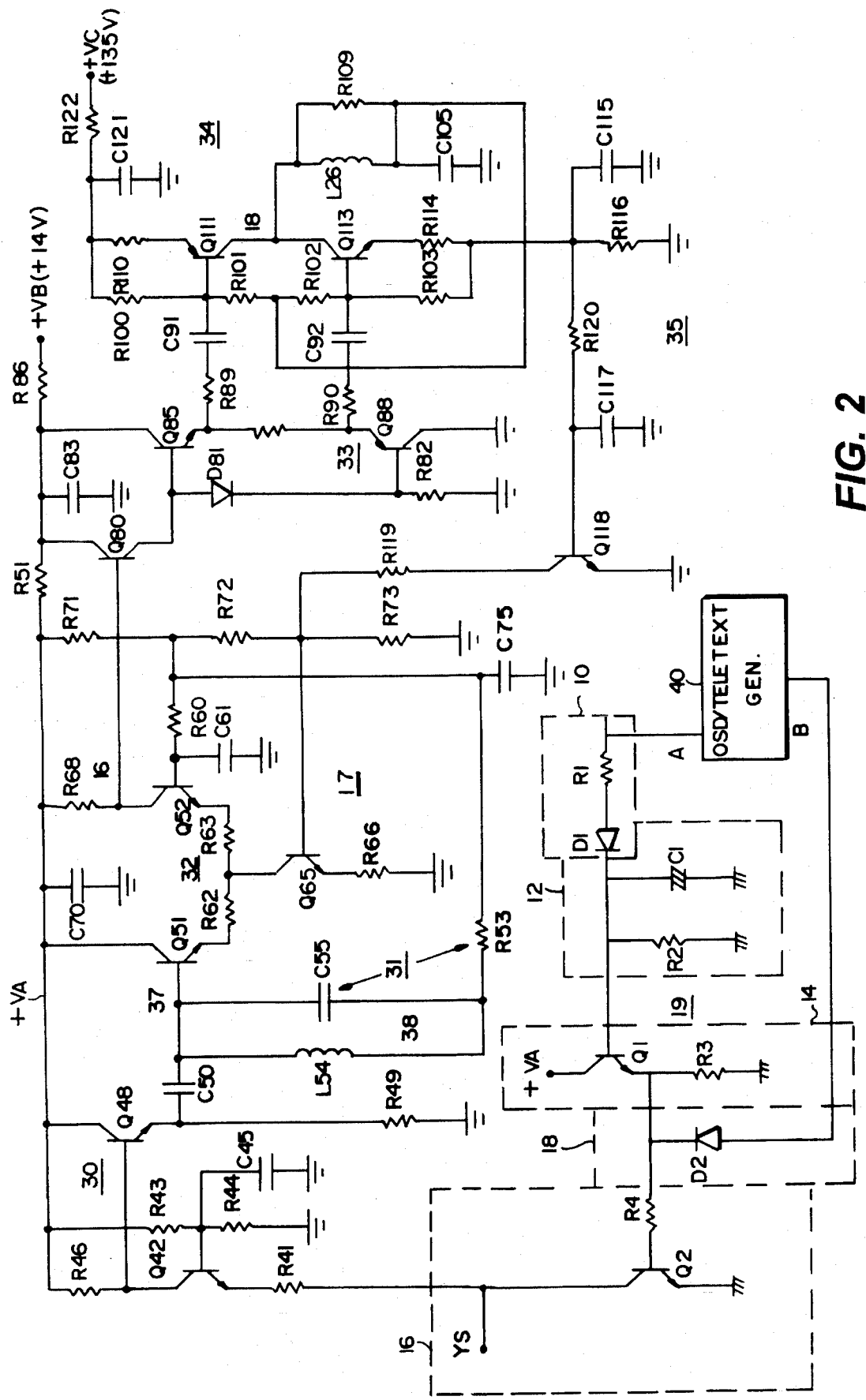
FIG. 2 is a detailed circuit diagram of the beam scan velocity modulation disabling apparatus of FIG. 1.

More particularly a luminance video signal YS is generated by comb filter 14 and is indicative of the wideband huminance signal Y that is applied to stage 17. Luminance video signal YS is applied to an input buffer amplifier 30 of SVM stage 35 through an SVM disabling circuit 19 which will be further described. The output of amplifier 30 is coupled to the input of a differential circuit 31, whereby the amplified video signal is differentiated. The differentiated video signal is then applied to the input of a limiter or limiting amplifier 32. Limiter or limiting amplifier 32 operates to limit excursions of the differentiated video signal in both the positive and negative directions in regard to normal operation. The output of limiter or limiting amplifier 32 is applied to the input of a driver amplifier 33 which serves to further process the signal, e.g., to provide noise coring. The output of driver amplifier 33 is coupled to the input of an output power amplifier 34 for converting the input voltage to the power amplifier into an output current. This current is proportional to the magnitude of the differentiated video signal and is used to drive SVM coil 26. FIG. 2 illustrates 2 portion of the circuitry of FIG. 1, including a detailed embodiment of SVM stage 35. In FIG. 2, luminance video signal YS is applied via a resistor R41 to the emitter electrode of a transistor Q42 arranged in a common base configuration. Base biasing for the common base transistor is obtained by a voltage divider comprising resistors R43 and R44 coupled between a source of operating potential +VA and ground. A bypass capacitor C45 is coupled between ground and the base electrode of transistor Q42. The collector electrode of transistor Q42 is directed through a load resistor R46 to the source of operating potential +VA. The collector electrode of transistor Q42 is also coupled to the base electrode of a transistor Q48 arranged in an emitter follower configuration. The collector electrode of transistor Q48 is coupled to the source of operating potential +VA, and the emitter electrode is directed to ground via a resistor R49. The emitter electrode is also AC coupled via a capacitor C50 to the base electrode of a transistor Q51. Transistor Q51 is a portion of the differential limiting amplifier 32 of FIG. 1.

The base of transistor Q51 is coupled to a tank circuit comprising an inductor L54 in shunt with a capacitor C55. The tank circuit operates to provide a flattened group delay in regard to operation of differentiator 31 so as to compensate for the characteristic thereof, thereby linearizing the differentiated output with regard to high frequency operation. Differentiator 31 comprises capacitor C55 and a resistor R53. Resistor R53 has one terminal coupled to a terminal of the tank circuit remote from the base of transistor Q51 and another terminal coupled to the junction between resistors R71 and R72 of a voltage divider comprising resistors R71, R72 and R73. The voltage divider establishes the bias point of the differential limiting amplifier.

Differential limiting amplifier 32 includes transistor Q51 and a transistor Q52. Transistor Q51 has a collector electrode directly coupled to the source of operating potential +VA and an emitter electrode coupled via a resistor R62 to a controllable current source 18, at the collector electrode of a transistor Q65. Transistor Q65 has the emitter electrode coupled through a resistor R66 to ground. In a similar manner, transistor Q52 has its emitter electrode coupled to the collector electrode of constant current source transistor Q65 via a resistor R63. Resistors R62 and R63 may be equal in magnitude. The collector electrode of transistor Q52 is coupled to the source of operating potential +VA via a collector load resistor R68. The collector electrode of transistor Q52 provides the output of limiting amplifier 32. The base electrode of transistor Q52 is coupled to the junction between resistors R71 and R72 via a resistor R60. The base electrode of transistor Q52 is coupled to ground by a capacitor C61 which operates as a bypass for high frequency signal components. DC biasing for transistor Q51 is obtained via the connection of resistor R53. Resistor R60 and resistor R53 are of the same magnitude to enable transistors Q51 and Q52 to receive equal DC biasing. The base electrode of current source transistor Q65 is coupled to the junction between voltage dividing resistors R72 and R73 and is also coupled to the collector electrode of a control transistor Q118, for controlling the current through limiting amplifier 32. This control varies the peak-to-peak output signal of the limiter, as will be further explained, and also provides double ended limiting.

The collector electrode of transistor Q52 is directly coupled to the base electrode of an emitter follower transistor Q80. The collector electrode of transistor Q80 is coupled to a source of operation potential +VB, and the output emitter electrode is coupled to a driver stage 33.

Driver amplifying stage 33 comprises complementary type transistors Q85 and Q88, with the base of transistor Q85 being directly coupled to the emitter of transistor Q80 and with the base of transistor Q88 being coupled to the emitter of transistor Q80 via a diode D81. Diode D81 is directly coupled between the bases of the two driver transistors. A resistor R87 is coupled between the emitters of transistors Q85 and Q88, and a resistor R82 is coupled between the base of transistor Q88 and ground. Transistors Q85 and Q88 form a Class B amplifier which operates to drive output stage 34. The Class B amplifier also provides a low level, noise coring function. The emitter electrodes of transistors Q85 and Q88 in Class B driver stage 33 are AC coupled to the respective base electrodes of complementary type transistors Q111 and Q113 of output stage 34. To provide the AC coupling, the emitter electrodes of transistors Q85 and Q88 are coupled through respective resistors R89 and R90 in series with respective capacitors C91 and C92.

The emitter electrode of transistor Q111 is directed through a resistor R110 to a source of operating potential +VC. A resistor R122 and a capacitor C121 provide current limiting and supply filtering. The source of operating potential +VC is a DC source of relatively high magnitude, as for example, 135 volts, compared to the source of potential +VB, as for example, 14 volts. This enables output amplifier stage 34 to supply high frequency current to SVM coil L23.

The collector electrode of transistor Q111 is coupled to the collector electrode of transistor Q113, thereby forming a Class B output stage. Biasing for the output stage transistors is obtained from a voltage divider comprising resistors R100, R101, R102 and R103. The emitter electrode of transistor Q113 is coupled to ground via a resistor R114 and a current sampling resistor R116. Resistor R116 is shunted by means of a filter capacitor C115.

The time constant for the RC filter of resistor R116 and capacitor C105 is on the order of 20 to 30 horizontal line periods.

One terminal of SVM coil L26 is directed to the junction of the collector electrodes of transistors Q111 and Q113, and the other terminal is coupled to a grounded capacitor C105. In this manner, the SVM coil is AC coupled to the output stage 34, and no DC current can flow in the coil. A damping resistor R109 is coupled across the SVM coil. DC stabilization is provided by coupling the junction of SVM coil L26 and capacitor C105 to the junction of resistors R101 and R102.

Output stage 34 includes current feedback afforded by resistor R116 to prevent overdissipation in the output stage when luminance signal YS has, on the average, substantial high frequency content. The average current through output stage 34 flows through sampling resistor R116. The filtered voltage developed across resistor R116 is representative of this output current and is coupled to the base electrode of a transistor Q118 via a resistor R120. The base electrode of a transistor Q118 is bypassed to ground through a capacitor C117.

The magnitude of capacitor C117 is selected to greatly attenuate any high frequency signals and noise that may be undesirably coupled to transistor Q118.

The collector electrode of transistor Q118 is coupled via a resistor R119 to the junction between voltage dividing resistors R72 and R73, at the base electrode of constant current transistor Q65.

SVM disabling circuit 19 includes transistors Q1 and Q2, with the base of transistor Q1 being coupled to the cathode electrode of a diode D1 in series with a resistor R1 whose one end A is connected to OSD/TELETEXT generator 40 and with the base electrode of transistor Q2 being coupled to the emitter electrode of transistor Q1 via a resistor R4, wherein an OSD/TELETEXT input portion 10 is formed with diode D1 in series with resistor R1 whose one end A is connected to OSD/TELETEXT generator 40. The collector electrode of transistor Q1 is directed to operating potential +VA and the emitter electrode of transistor Q1 is coupled to ground through a resistor R3, wherein a first switching portion 14 is formed with transistor Q1 whose emitter electrode is directed to ground via resistor R3, whose base electrode is coupled to the cathode electrode of diode D1 and whose collector electrode is directed to operating potential +VA. The cathode electrode of a diode D2 is connected to the junction of resistor R4 and the emitter electrode of transistor Q1, and the anode electrode B of diode D2 is directly coupled to OSD/TELETEXT generator 40, wherein FULL TELETEXT input portion 18 is formed with diode D2 whose cathode electrode is connected to the junction of resistor R4 and the emitter electrode of transistor Q1 and whose anode electrode B is directly coupled to OSD/TELETEXT generator 40. A resistor R2 and a capacitor C1 are respectively connected to the junction of the base electrode of transistor Q1 and the cathode electrode of diode D1 to form an integrating circuit 12 with respect to a blanking pulse inputted from OSD/TELETEXT generator 40. The collector electrode of transistor Q2 is directly coupled to resistor R41 of input buffer amplifier 30, connected to comb filter 14 to receive luminance signal YS, and the emitter electrode of transistor Q2 is directed to ground, so that a second switching portion 16 is formed.

The beam scan velocity modulation apparatus with SVM disabling circuit according to one embodiment of the present invention will be explained below in detail.

That is, when a blanking pulse from OSD/TELETEXT generator 40 is inputted to the one end A of resistor R1 of SVM disabling circuit 19, the blanking pulse goes through integrating circuit 12 via resistor R1 and diode D1 so that a certain voltage is charged in capacitor C1 in accordance with the inputted blanking pulse. In case that the inputted pulse has a width over a certain time period, the voltage charged in capacitor C1 is larger than that between the base-emitter electrodes of transistor Q1. Therefore, transistor Q1 is switched on so that the voltage across resistor R3 reaches to operating potential +VA. This operating potential +VA switches on transistor Q2 through resistor R4. With transistor Q2 turned on, the luminance signal YS inputted to the collector electrode of transistor Q2 is bypassed to ground, rather than being inputted to input buffer amplifier 30 of SVM stage 35. A blanking pulse having a width enough for charging a voltage in capacitor C1 to switch on transistor Q1 generates an OSD display portion larger than a certain display size on the screen of kinescope 21. Accordingly, when an OSD display size on the screen is displayed over a certain size, no luminance signal YS is inputted to SVM stage 35 so that an OSD display can be obtained without any ghost image near or behind the OSD display caused by the luminance signal YS.

Also, when a full screen of kinescope 21 is employed for teletext information, a certain level of dc voltage from OSD/TELETEXT generator 40 is inputted to the anode electrode B of diode D2 of SVM disabling circuit 19. The dc voltage directly switches on transistor Q2, resulting in bypassing luminance signal YS to ground as mentioned above. Therefore, a teletex display in a full screen can be obtained without influence of luminance signal YS.

As mentioned above, with the beam scan velocity modulation apparatus with SVM disabling circuit, an OSD display over a certain display size or a full-screen teletext display is obtained on the screen without any ghost image caused by a luminance signal.

The present invention is concretely described above with a preferred embodiment. However, the present invention is not limited to the embodiment and can be modified or improved in the scope of common kowledge of those skilled in this field.

What is claimed is:

1. A beam scan velocity modulation apparatus with a scan velocity modulation (SVM) disabling circuit comprising:
   a picture display device;

a source of a first video signal, said first video signal including a luminance signal and picture information for display on said picture display device;

an OSD/TELETEXT display generator having on-screen display information or teletext display information displayed on said picture display device when said OSD/TELETEXT display generator is selected, said generator being selected according to a user's input and producing pulses on a line by line basis and a certain level of dc voltage, indicative of insertion of said picture information and of a full-screen teletext display information;

a scan velocity modulation circuit coupled to said source for modulating information displayed on said picture display device in accordance with a video content of said first video signal; and an SVM disabling circuit responsive to said pulses and said dc voltage and coupled to said scan velocity modulating circuit for modifying operation of said scan velocity modulating circuit when said OSD/TELETEXT display generator is selected, said SVM disabling circuit including:

an OSD/TELETEXT input portion with a first diode in series with a first resistor whose one end is connected to said OSD/TELETEXT display generator;

a first switching portion with a first transistor whose emitter electrode is directed to ground via a third resistor, whose base electrode is coupled to the cathode electrode of said first diode and whose collector electrode is directed to an operating potential;

a FULL TELETEXT input portion with a second diode whose cathode electrode is connected to the junction of a fourth resistor and the emitter electrode of said first transistor and whose anode electrode is directly coupled to said OSD/TELETEXT display generator;

an integrating circuit with a second resistor and capacitor respectively connected to the junction of the base electrode of said first transistor and the cathode electrode of said first diode; and a second switching portion with the collector electrode of a second transistor directly coupled to said scan velocity modulating circuit and inputting said luminance signal, the emitter electrode of said second transistor directed to ground and the base electrode of said second transistor connected to the emitter electrode of said first transistor through aid fourth resistor.

2. A beam scan velocity modulation apparatus with a scan velocity modulation disabling circuit, comprising:

picture display device;

a source of a first video signal, said first video signal including a luminance signal and picture information for display on said picture display device;

an OSD/TELETEXT display generator having on-screen display information or teletext display information displayed on said picture display device when said OSD/TELETEXT display generator is selected, said generator being selected according to a user's input and producing pulses on a line by line basis and a certain level of dc voltage, indicative of insertion of said picture information and of a full-screen teletext display information;

a scan velocity modulation circuit coupled to said source for modulating information displayed on said picture display device in accordance with a video content of said first video signal; and an SVM disabling circuit responsive to said pulses and said dc voltage and coupled to said scan velocity modulating circuit for modifying operation of said scan velocity modulating circuit when said OSD/TELETEXT display generator is selected, said SVM disabling circuit including:

means for generating a first dc voltage with inputs of said pulses from said OSD/TELETEXT display generator;

means for amplifying said first dc voltage;

an OR gate means for OR-gating a second dc voltage and said amplified first dc voltage in order to selectively produce said second dc voltage and said first dc voltage; and means for bypassing said luminance signal when an output of said OR gate means is generated.

3. The beam scan modulation circuit with an SVM disabling circuit as claimed in claim 2, wherein said first dc voltage generating means includes an OSD/TELETEXT input portion and an integrating circuit, said OSD/TELETEXT input portion having a first diode in series with a first resistor whose one end is connected to said OSD/TELETEXT display generator and said integrating circuit having a second resistor and a capacitor connected in parallel to each other and connected respectively to the cathode electrode of said first diode.

4. The beam scan velocity modulation apparatus with an SVM disabling circuit as claimed in claim 3, wherein said amplifying means includes a first transistor whose emitter electrode is directed to ground via a third resistor, whose base electrode is coupled to the cathode electrode of said first diode and whose collector electrode is directed to an operating potential.

5. The beam scan velocity modulation apparatus with an SVM disabling circuit as claimed in claim 4, wherein said OR gate means includes a second diode whose cathode electrode is connected to the junction of a fourth resistor and the emitter electrode of said first transistor and whose anode electrode is directly coupled to said OSD/TELETEXT display generator.

6. The beam scan velocity modulation apparatus with an SVM disabling circuit as claimed in claim 5, wherein said bypassing means includes a second transistor whose collector electrode is directly coupled to said scan velocity modulating circuit for inputting luminance signal, whose emitter electrode is directed to ground and whose base electrode is connected to the emitter electrode of said first transistor through said fourth resistor.

* * * * *